(12) United States Patent
Miura

(10) Patent No.: US 8,731,404 B2
(45) Date of Patent: *May 20, 2014

(54) OPTICAL TRANSMISSION SYSTEM

(71) Applicant: Furukawa Electric Co., Ltd., Tokyo (JP)

(72) Inventor: Masayuki Miura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,633

(22) Filed: Nov. 30, 2012

(65) Prior Publication Data

US 2013/0108272 A1 May 2, 2013

Related U.S. Application Data

(63) Continuation of application No. 12/760,255, filed on Apr. 14, 2010, now Pat. No. 8,340,521, which is a continuation of application No. 12/046,069, filed on Mar. 11, 2008, now Pat. No. 7,783,201, which is a continuation of application No. PCT/JP2006/324551, filed on Dec. 8, 2006.

(30) Foreign Application Priority Data

| Dec. 9, 2005 | (JP) | 2005-355928 |
| Dec. 9, 2005 | (JP) | 2005-355929 |
| Sep. 20, 2006 | (JP) | 2006-253771 |

(51) Int. Cl.
*H04J 14/00* (2006.01)

(52) U.S. Cl.
USPC ............... 398/72; 398/68; 398/71; 398/100; 398/173; 398/175; 398/176; 398/158; 398/159; 398/97; 398/98; 359/326; 359/328; 359/330; 359/332

(58) Field of Classification Search
USPC ........... 398/66, 67, 68, 69, 70, 71, 72, 98, 99, 398/100, 173, 174, 175, 176, 177, 181, 33, 398/38, 158, 159, 147, 79, 81, 160, 178, 398/179, 37, 34, 154, 155; 359/326, 330, 359/332, 328
See application file for complete search history.

(56) References Cited

U.S. PATENT DOCUMENTS 6,476,953 B1 11/2002 Morkel
6,847,616 B2 * 1/2005 Horisaki et al. ............... 370/252
(Continued)

FOREIGN PATENT DOCUMENTS

| JP | 03-034645 | 2/1991 |
| JP | 2001-251252 | 9/2001 |

(Continued)

*Primary Examiner* — Hanh Phan
(74) *Attorney, Agent, or Firm* — Oblon, Spivak, McClelland, Maier & Neustadt, L.L.P.

(57) ABSTRACT

An optical transmission system is provided. The optical transmission system includes a user side optical repeater device (ORD), a central office side ORD, and wavelength multiplexing and wavelength de-multiplexing functions (MUX/DEMUX). The user side optical repeater device (ORD) is to be connected with a user side optical network unit (ONU), transmits data in two ways, and is used for wavelength division multiplexing (WDM). The central office side ORD is to be connected with a central office side optical line terminal (OLT), transmits data in two ways, and is used for WDM. The wavelength multiplexing and a wavelength de-multiplexing functions (MUX/DEMUX), are used for relaying between the user side ORD and the central office side ORD.

3 Claims, 10 Drawing Sheets

(56) References Cited

U.S. PATENT DOCUMENTS

| | | | |
|---|---|---|---|
| 7,428,267 B2 * | 9/2008 | Lee et al. | 375/260 |
| 7,616,892 B2 | 11/2009 | Suzuki et al. | |
| 7,627,246 B2 | 12/2009 | Sorin et al. | |
| 7,646,702 B2 | 1/2010 | Sudo | |
| 7,783,201 B2 * | 8/2010 | Miura et al. | 398/173 |
| 8,340,521 B2 * | 12/2012 | Miura | 398/72 |
| 2004/0151171 A1 | 8/2004 | Lee et al. | |
| 2005/0188405 A1 | 8/2005 | Lee et al. | |
| 2006/0127100 A1 | 6/2006 | Frankel et al. | |
| 2007/0002878 A1 | 1/2007 | Moorti et al. | |
| 2007/0019956 A1 * | 1/2007 | Sorin et al. | 398/71 |

FOREIGN PATENT DOCUMENTS

| | | |
|---|---|---|
| JP | WO 02/41548 | 5/2002 |
| JP | 2002-223197 | 8/2002 |
| JP | 2002-261697 | 9/2002 |
| JP | 2002-271271 | 9/2002 |
| JP | 2004-064749 | 2/2004 |
| JP | 2005-175599 | 6/2005 |
| JP | 2005-197790 | 7/2005 |
| JP | 2005-229580 | 8/2005 |

* cited by examiner

OPTICAL TRANSMISSION SYSTEM

CROSS-REFERENCE TO RELATED APPLICATIONS

This application is a continuation of U.S. patent application Ser. No. 12/760,255, filed Apr. 14, 2010 which is a continuation of Ser. No. 12/046,069, filed Mar. 11, 2008 (now U.S. Pat. No. 7,783,201), the entire contents of each are incorporated herein by reference. U.S. Ser. No. 12/046,069 filed Mar. 11, 2008 (now U.S. Pat. No. 7,783,201) is a continuation of PCT/JP2006/324551 filed Dec. 8, 2006, which claims priority to Japanese Application Nos. JP2005-355928, filed Dec. 9, 2005; JP2005-355929, filed Dec. 9, 2005; and JP2006-253771, filed Sep. 20, 2006.

BACKGROUND OF THE INVENTION

1. Field of the Invention

The present invention relates to an optical repeater device (ORD) and an optical transmission system. More specifically, it relates to the ORD, and to an optical transmission system of a passive double star (PDS) type comprising a repeater of the ORD.

2. Description of Related Art

Regarding an optical network, such as a fiber to the home (FTTH), a cable television (CATV), and the like, an optical transmission system of a passive double star (PDS) type is used, in which a passive device is provided for a branching part branching a cable into the number of users on the way of a path from a central office to the users. Regarding the passive device, there is provided such as a splitter for example.

Such the splitter is to be connected with an optical fiber to be taken out for the user side from each optical subscriber unit (OSU) provided in an optical line terminal (OLT) at the central office. Moreover, optical paths branched by the splitter are to be connected with optical network units (ONU) for a plurality of users, via a plurality of optical fibers.

According to such the optical transmission system of the PDS type in which the OLT and a plurality of ONUs are connected using the optical fibers and the splitter, data are to be transmitted using an optical signal of only one wavelength. Hence, it is had for improving a large capacity.

On the contrary, a system for being able to perform a wavelength division multiplexing (WDM) communication, with using the ONU in such the existing optical transmission system without changing any, is reported in the below described patent document 1.

Regarding the system, as shown in FIG. 12, for optical fibers 104 connecting between an OSU 102 in an OLT 101 and a splitter 103, a first multiplexer/de-multiplexer (MUX/DEMUX) 105, an optical transmission path 106, a second MUX/DEMUX 107, and then a wavelength converter 108 are to be connected in order therewith, as a configuration thereof. Thus, according to the configuration, the existing splitter 103 and the existing ONU 109 are become able to be used. Moreover, between the OLT 101 and the ONU 109, a sufficient allowable dissipation becomes to be given, and then a distance restriction from dissipation becomes able to be removed. Therefore, it is reported therein that the large capacity and a long distance communication becomes able to be improved.

Regarding the wavelength converter 108, as shown in FIG. 13, a common configuration for wavelength conversion is to be adopted.

The common wavelength converter comprises two of 3 (dB) couplers 110a and 110b to be connected with the second MUX/DEMUX 107 and the splitter 103 respectively. Moreover, for both up and down as two pathways signalling system between the two of 3 (dB) couplers 110a and 110b, it comprises opto-electric conversion devices 111 and 121 as light receiving elements, 2R/3R receiver circuits 112 and 122, driver circuits 113 and 123 for the light receiving elements, light emission elements 114 and 124, and isolators 115 and 125, to be connected in order toward the signal propagation direction respectively. Thus, there is provided a configuration thereby.

Moreover, such as disclosed in the patent document 1, there is reported a configuration regarding the wavelength converter 108, with omitting the light receiving element 121, the receiver circuit 122, the driver circuit 123, and the light emission element 124 on the down signaling pathway.

Furthermore, such as in a below disclosed nonpatent document 1, there is reported a configuration that, for a down signaling system of the optical signaling pathways between the OLT and the splitter, a 2.488 Gbit/s converter, a dense wavelength division multiplexer (DWDM), and another converter are connected in order toward the signal propagation direction therein. Moreover, for a up signaling system therein, a converter, a DWDM, and an optical channel filter are connected in order toward the signal traveling direction, as the configuration. And then the long distance between the OLT and the ONU becomes to be improved. Moreover, the DWDM is to be comprised of a semiconductor laser, a modulator, an optical receiver, a variable optical attenuator (VOA) and the MUX/DEMUX.

[Patent Document 1] Japanese Patent Application Publication No. 2002-261697

[Nonpatent Document 1] R. P. Davey et al. "DWDM reach extension of a GPON to 135 km" PDP35, 2005, Optical Society of America Regarding the optical transmission system according to the patent document 1 and the nonpatent document 1, there are some problems as described below.

A first problem is that a load of time and cost for exchanging an existing OLT is quite large, due to realizing impossible with using the existing OLT regarding the optical transmission system according to the patent document 1 and the nonpatent document 1. The reason is described as below.

Regarding the existing OLT, there are some for example regulations compliant, such as a gigabit passive optical network (G-PON) to be pursuant to the international telecommunication union telecommunication standardization sector (ITU-T) standard G.984.x, a gigabit Ethernet (the registered trade name) PON (GE-PON) to be pursuant to the IEEE 802.3ah standard of the Ethernet in the first mile (EFM), and the like. Meanwhile, regarding the OLT regulated by the G-PON and the GE-PON, a sending wavelength range is determined between 1.48 and 1.50 µm, and the receiving wavelength is determined as a range between 1.26 and 1.36 µm. However, essentially such the existing OLT is not suitable for exclusive use of WDM transmission.

Regarding the system according to the patent document 1, signals of different wavelengths are required to be generated in the OLT itself, and to be transmitted to the MUX/DEMUX. Therefore, the existing OLT becomes necessary to be changed for WDM transmission.

Moreover, for an optical amplifying system regarding the DWDM according to the nonpatent document 1, because of a structure for receiving a signal of 1.55 µm wavelength-band therein, the existing OLT of the receiving wavelength between 1.26 and 1.36 µm is not able to be used for direct receiving.

A second problem is that, regarding the PDS type system of time division multiplex (TDM), such as the G-PON, the GE-PON, or the like, from a plurality of ONUs connected with single splitter, signals are not able to be transmitted to the OLT at the same time. Hence, upward signals from the ONU side to the OLT become to be burst signals. And then a preamble signal included in the burst signals cannot help but be disappeared.

In the case of relaying the burst signal by the wavelength converter, shown as signals surrounded by dashed lines in FIG. 13, a burst signal S1 is to be input from the ONU 109 to the wavelength converter 108, via the splitter 103. And then at the period of the burst signal S1 being processed in the receiver circuit 112, a part of the preamble signal for signal identification included in the burst signal S1 cannot help but be disappeared. Moreover, the disappearance of the preamble signal is occurred for the following reason.

That is to say, regarding the upward signal, a level of a signal input from the ONU 109 to the wavelength converter 108 is different from each of the ONU 109. And then in the case of receiving a burst signal from each ONU 109, in the receiver circuit 112, for identifying a signal level of "0" and "1", it needs to be processed as feedforward based on the received signal. Hence, a certain amount of time is required for such the process. Normally, as the burst signal, a preamble signal is added onto a data signal therein. And then during the certain amount of time for identifying the signal level in the wavelength converter 108, the corresponding amount of the preamble signals cannot help but be disappeared.

In other words, for a long distance transmission regarding the optical transmission system, to avoid a waveform degradation, at the receiver circuit 112 in the wavelength converter 108, a 3R process, that is to say, an equalized amplifying as a re-shaping, an identification and a regeneration, and a re-timing become necessary to be performed. However, for the re-timing process, a data and a clock are regenerated based on the received signal. Hence, a certain amount of time is required for the process, and then the disappearance of the preamble signal is occurred. Meanwhile, for regenerating the stable data and the stable clock based on the burst signal, generally, with a time constant longer, the receiving signals are better to be taken in the longer period of time thereinto. And then it becomes a trade off relation with the disappearance of the preamble signal. Therefore, in the case of taking time for regenerating the data and the clock too short, the data and the clock cannot help but be regenerated properly.

As above mentioned, in the case of using the wavelength converter as a repeater, with such the ordinary methods, at least a part of the preamble signal cannot help but be disappeared. And then comparing to a case without using the repeater, the preamble signal to be input into the OLT cannot help but be shorter. Hence, at the OLT side, there is a case occurred that a burst signal becomes unable to be received.

On the contrary, by presetting bit numbers larger regarding the preamble signal included in the burst signal, the disappearance of the preamble signal at the repeater is to be supplemented, as a method to be adopted and may be considered. However, a bit number ratio of the preamble signal occupies in the burst signal becomes higher. And then the bit number ratio of the data signal occupies in the burst signal cannot help but be lower. Hence, a transmission capacity (throughput) as a total system cannot help but be decreased.

A third problem is that, according to the patent document 1 and the nonpatent document 1, the upward burst signal from the ONU to the OLT is to be directly relayed, as the system. Therefore, all devices and components to be used in the upward section of the system are necessary to be corresponding to the burst signal. Hence, a component for continuous signals as more simple configuration and lower cost is not able to be used therefor. And then the cost for the total system cannot help but be increased.

BRIEF SUMMARY OF THE INVENTION

An object of the present invention is to provide an optical repeater device (ORD) and an optical transmission system of long distance transmission possible, with keeping a transmission throughput without decreasing, and with being able to reducing the cost for system change.

A first aspect of the present invention for solving the above mentioned problems is an optical repeater device (ORD) comprising: a preamble compensating circuit, for taking out a normal data signal from burst signals propagating through a communication transmission path, and for adding a preamble signal before and/or after the above mentioned data signal.

A second aspect of the present invention is the ORD according to the first aspect, wherein the above mentioned preamble compensating circuit is to be connected with a signal output terminal on a receiver circuit of 3R, for equalized amplifying (re-shaping) an electric signal which is photo-electric converted, for identification and regeneration (re-generating) thereof, and for re-timing thereof.

A third aspect of the present invention is the ORD according to the first or the second aspect, wherein the above mentioned preamble compensating circuit comprises: a detector circuit, for inputting the above mentioned burst signal, and for outputting only the above mentioned normal data signal; a buffer circuit, for storing the above mentioned data signal output from the above mentioned detector circuit, and for outputting thereof; a preamble signal generation circuit, for outputting at least one type of the above mentioned preamble signal; and a data output select circuit, for outputting the above mentioned data signal at the time of the above mentioned data signal input from the above mentioned buffer circuit, and for outputting the above mentioned preamble signal from the above mentioned preamble signal generation circuit at any other time thereof.

A fourth aspect of the present invention is the ORD according to the third aspect, wherein the above mentioned data output select circuit synchronizes the above mentioned preamble signal and the above mentioned data signal with a clock output from a reference clock source unit, and outputs both of the signals.

A fifth aspect of the present invention is the ORD according to the third or the fourth aspect, which further comprises a control circuit, for selecting a type of the above mentioned preamble signal from the above mentioned preamble signal generation circuit to generate two types or more of the above mentioned preamble signals.

A sixth aspect of the present invention is the ORD according to any one of the third to the fifth aspects, wherein the above mentioned data output select circuit has a function for adding the above mentioned preamble signal into a gap between any neighboring pair of the above mentioned burst signals.

A seventh aspect of the present invention is the ORD according to any one of the third to the fifth aspects, wherein the above mentioned data output select circuit further has a function for adding an error signal of an encoding rule into a gap between any neighboring pair of the above mentioned burst signals.

An eighth aspect of the present invention is the ORD according to the seventh aspect, wherein the above mentioned error signal is to be a signal repeats "1" and "0" alternately with not less than a predetermined number of times.

A ninth aspect of the present invention is the ORD according to the seventh or the eighth aspect, wherein the above mentioned error signal is to be added onto all gaps between any neighboring pair of the above mentioned burst signals.

A tenth aspect of the present invention is an optical transmission system comprising: said ORD of any one of the first to the ninth aspects, of which at least one is provided between a user side optical network unit (ONU) and a central office side optical line terminal (OLT).

A first aspect of the optical transmission system of the present invention is the optical transmission system comprising: a user side optical repeater device (ORD) to be connected with a user side optical network unit (ONU), for transmitting data in two ways, and for wavelength division multiplexing (WDM); a central office side ORD to be connected with a central office side optical line terminal (OLT), for transmitting data in two ways, and for WDM; and a wavelength multiplexing and a wavelength de-multiplexing functions (MUX/DEMUX), for relaying between the above mentioned user side ORD and the above mentioned central office side ORD.

A second aspect of the optical transmission system of the present invention is the optical transmission system according to the first aspect, wherein the above mentioned user side ORD comprises: a first up optical transmission circuit, for converting a plurality of optical signals output from the above mentioned user side ONU into optical signals of different wavelength respectively, and for outputting to the above mentioned wavelength MUX/DEMUX; a first down optical transmission circuit, for converting optical signals of different wavelength output from the above mentioned central office side ORD via the above mentioned wavelength MUX/DEMUX into optical signals of the same wavelength-band, and for outputting the above mentioned optical signals to an optical transmission path reaching the above mentioned user side ONU; and wherein the above mentioned central office side ORD comprises: a second down optical transmission circuit, for converting a plurality of optical signals output from the above mentioned central office side OLT into optical signals of different wavelength respectively, and for outputting to the above mentioned wavelength MUX/DEMUX; and a second up optical transmission circuit, for outputting optical signals of different wavelength, output from the above mentioned user side ONU via the above mentioned wavelength MUX/DEMUX, to an optical transmission path reaching the above mentioned central office side OLT, with same wavelengths respectively.

A third aspect of the optical transmission system of the present invention is the optical transmission system according to the first or the second aspect, wherein the above mentioned user side ORD further comprises a preamble compensating circuit, for taking out a normal data signal from burst signals propagated from the above mentioned user side ONU, and for adding a preamble signal before and/or after the above mentioned data signal.

A fourth aspect of the optical transmission system of the present invention is the optical transmission system according to any one of the first to the third aspects, wherein a wavelength of a signal transmitted from the above mentioned user side ORD to the above mentioned central office side ORD is to be a band of 1.3 μm.

According to the present invention, both of a central office side optical repeater device (ORD) and a user side ORD have a wavelength division multiplexing (WDM) function respectively. And then using an existing user side optical network unit (ONU) and an existing central office side optical line terminal (OLT), a transmission becomes possible with the existing wavelength as the standard band thereof. Therefore, with using the existing specified side OLT and the user side ONU without changing any, the long distance communication becomes possible to be realized.

Moreover, regarding the user side ORD, functions are provided therein, that a preamble signal included in a burst signal is to be deleted, and then another preamble signal is to be added onto before and/or after a normal data. Thus, a decrease of the throughput for data transmission, due to a disappearance of the preamble signals occurred in ordinary repeaters, becomes able to be prevented.

Furthermore, for a gap between any neighboring pair of the burst signals output from the user side ONU, a preamble signal is to be added in the preamble compensating circuit, and then the signal is to be output as a continuous signal therefrom. Therefore, for subsequent components from then onward, a low cost component becomes possible to be used, because of not for burst signals but for continuous signals.

According to the present invention, the preamble signal included in the burst signal is to be deleted, and then another preamble signal is to be added onto before and/or after the normal data. Therefore, the decrease of the throughput for data transmission, due to the disappearance of the preamble signals.

Moreover, for the gap between any neighboring pair of the burst signals output from the user side ONU, the preamble signal is to be added in the preamble compensating circuit, and then the signal is to be output as the continuous signal therefrom. Thus, for the subsequent components from then onward, the low cost component becomes possible to be used, because of not for burst signals but for continuous signals.

Moreover, according to the present invention, for both sides of the central office side and the user side, the ORDs having the WDM function corresponding to optical signals are connected respectively thereto. And then with using the existing user side ONU and the existing central office side OLT, the transmission becomes possible with the existing wavelength as the standard band thereof. Therefore, with using the existing specified central office side OLT and the existing specified user side ONU without changing any, the long distance communication becomes possible to be realized. Especially, in the case of wavelength multiplexed transmitting, different from other technologies, an optical transmission module for burst signals becomes unnecessary, which corresponds to each wavelength thereof. Therefore, a module for general purpose, such as an optical transmission module for coarse wavelength division multiplexing (CWDM), an optical transmission module for dense wavelength division multiplexing (DWDM), or the like, becomes possible to be used thereby.

Furthermore, the present invention is also applicable to the system of the GE-PON as the IEEE compliant, and to the system of the G-PON as the ITU-T compliant.

DESCRIPTION OF THE REFERENCE NUMERALS

10: OLT
11-1, 11-2 to 11-n: OSU
20: CENTRAL OFFICE SIDE ORD
21: MUX/DEMUX
22-1, 22-2 to 22-n: WAVELENGTH CONVERTING DEVICE
23: WDM COUPLER
24: RAY PATH
25: LIGHT RECEIVING ELEMENT
26: RECEIVER CIRCUIT
27: DRIVER CIRCUIT
28: LIGHT EMISSION ELEMENT
29: DOWN TRANSMISSION SYSTEM CIRCUIT
30: OPTICAL TRANSMISSION PATH
40: USER SIDE ORD
41: MUX/DEMUX
42-1, 42-2 to 42-n, 42, 42a, 42b: WAVELENGTH CONVERTING DEVICE
43, 43a, 43b, 43c, 43d: WDM COUPLER
44: DOWN TRANSMISSION SYSTEM CIRCUIT
45, 45a: UP TRANSMISSION SYSTEM CIRCUIT
46: LIGHT RECEIVING ELEMENT
47: RECEIVER CIRCUIT
48: DRIVER CIRCUIT
49: LIGHT EMISSION ELEMENT
51: LIGHT RECEIVING ELEMENT
52: RECEIVER CIRCUIT
53: PREAMBLE COMPENSATING CIRCUIT
54: DRIVER CIRCUIT
55: LIGHT EMISSION ELEMENT
60: OPTICAL COUPLER
62-1, 62-2 to 62-n: ONU

DETAILED DESCRIPTION OF THE INVENTION

Embodiments of the present invention will be described in detail below, based on the drawings.

The First Embodiment

Figure 1:
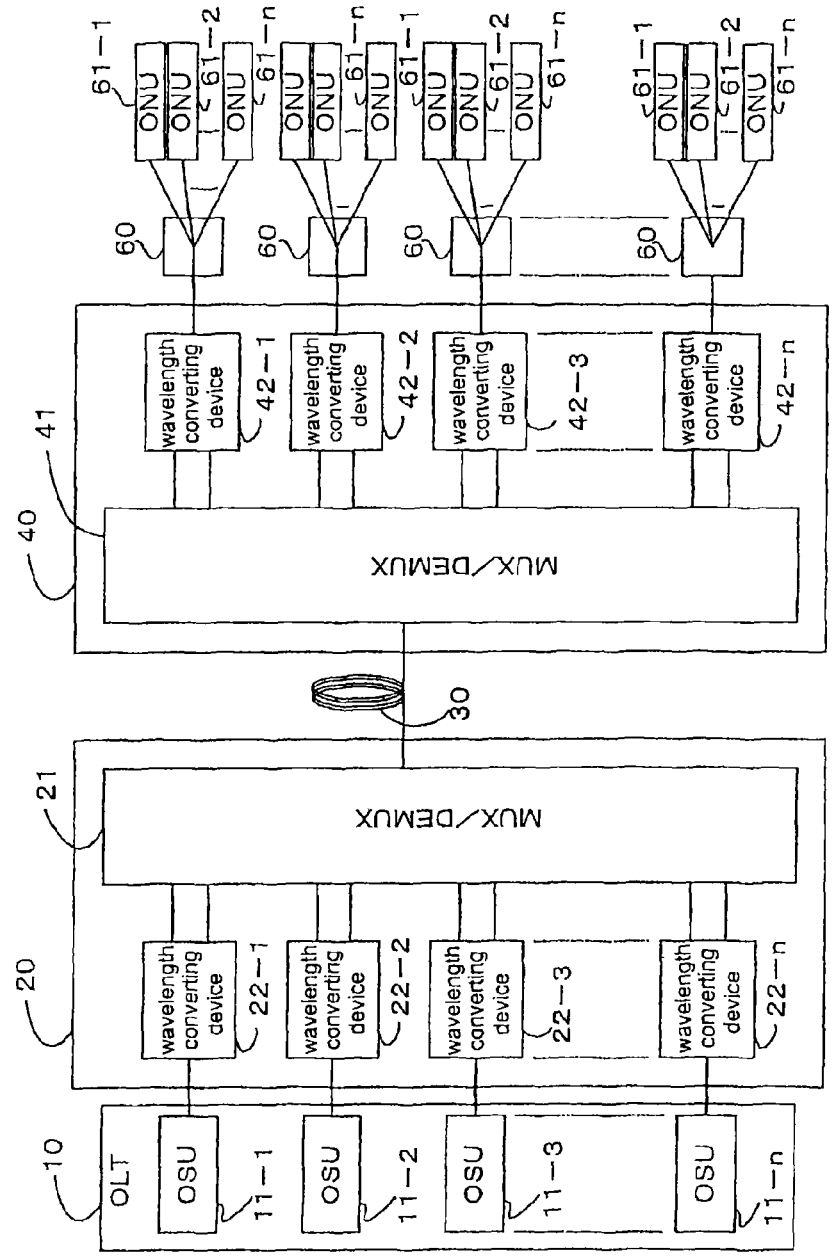
FIG. 1 is a diagram of an optical transmission system regarding the first embodiment of the present invention.

FIG. 1 is a diagram showing a configuration of a PDS type optical transmission system regarding the first embodiment of the present invention.

In FIG. 1, optical subscriber units (OSUs) 11-1, 11-2 to 11-n provided inside a center side optical line terminal (OLT) 10 compliant with such as the G-PON, the GE-PON, or the like, are connected with a plurality of user side optical network units (ONUs) 61-1, 61-2, to 61-n respectively, via a central office side optical repeater device (ORD) 20, an optical transmission path 30, a user side ORD 40, and an optical coupler (a splitter) 60. Moreover, any one of such the ONUs 61-1, 61-2, to 61-n comprises a configuration compliant with the G-PON, the GE-PON, or the like.

Moreover, the central office side ORD 20 comprises wavelength converting devices 22-1, 22-2, 22-n to be connected with each OSU 11-1, 11-2, 11-n respectively, and a multiplexer/de-multiplexer (MUX/DEMUX) 21 to be connected with such the wavelength converting devices 22-1, 22-2, 22-n.

Moreover, the user side ORD 40 comprises a MUX/DEMUX 41 to be connected with the central office side MUX/DEMUX 21 via the optical transmission path 30, a plurality of wavelength converting devices 42-1, 42-2 to 42-n to be connected with a down signal side of the MUX/DEMUX 41. Moreover, each of the wavelength converting devices 42-1, 42-2 to 42-n is individually connected with each of the optical coupler 60. Furthermore, such the optical coupler 60 splits the optical path into plural number via an optical fiber for each. And then a plurality of the ONUs 61-1, 61-2 to 61-n are to be connected therewith.

Figure 2:
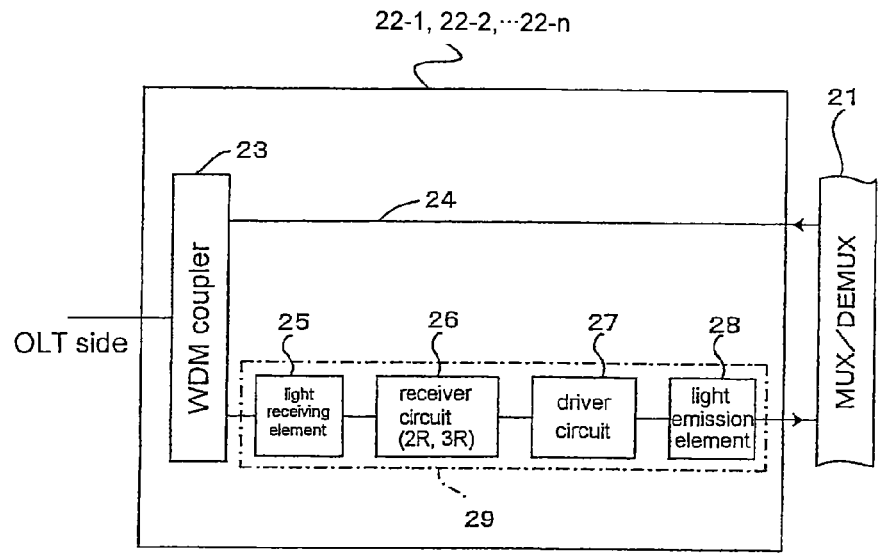
FIG. 2 is a diagram showing a wavelength converting device to be comprised of a central office side ORD used for the optical transmission system regarding the first embodiment of the present invention.

Moreover, any one of the wavelength converting devices 22-1, 22-2 to 22-n comprises, as shown in FIG. 2, a wavelength division multiplexing (WDM) coupler 23 to be connected with the corresponding OSU 11-1, 11-2 to 11-n respectively, a ray path 24 to be connected with a receiving terminal on the WDM coupler 23 for the MUX/DEMUX 21, a down transmission system circuit 29 to be connected with a sending terminal on the WDM coupler 23 for the MUX/DEMUX 21. Furthermore, the ray path 24 is to be an optical device for passing through an optical signal, such as an optical fiber, a power line communication (PLC), or the like.

Moreover, the down transmission system circuit 29 comprises a light receiving element 25, a receiver circuit 26, a driver circuit 27 and a light emission element 28. In such the system, the light receiving element 25 comprises a configuration, in which an optical signal propagated from the WDM coupler 23 is converted into an electric signal, and the electric signal is to be output to the receiver circuit 26. Moreover, the receiver circuit 26 has a 2R function or a 3R function, and then an output terminal is to be connected electrically to the driver circuit 27 for the light emission element 28 therefrom. Here, the 2R function is for two functions of identification and regeneration, and a re-timing. Furthermore, the 3R function is to be added a function of an equalized amplifying as a re-shaping, with such the two functions.

Moreover, the driver circuit 27 comprises a configuration, in which the light emission element 28 is to be driven based on the signal processed in the receiver circuit 26, and then an optical signal of a predetermined wavelength is to be emitted from the light emission element 28 into the MUX/DEMUX 21. Here, each of the light emission elements 28 in any one of a plurality of the wavelength converting devices 22-1, 22-2 to 22-n is to be a semiconductor laser diode for example, comprising a configuration for emitting lights in a 1.5 μm wavelength-band, as a different wavelength of $\lambda_{21}$, $\lambda_{22}$ to $\lambda_{2n}$ respectively. Furthermore, the wavelength division multiplexing (WDM) becomes to be performed thereby.

Moreover, the MUX/DEMUX 21 in the central office side ORD 20 is to be configurated, for multiplexing optical signals of different wavelengths emitted from each of a plurality of wavelength converting devices 22-1, 22-2 to 22-n, and then for transmitting the multiplexed optical signals to the optical transmission path 30. Meanwhile, it is to be also configurated, for de-multiplexing the multiplexed optical signals transmitted from the optical transmission path 30, and then for outputting the de-multiplexed optical signals to the wavelength converting devices 22-1, 22-2 to 22-n.

Here, the ray path 24 and the down transmission system circuit 29 in any one of the wavelength converting devices 22-1, 22-2 to 22-n are individually connected with the MUX/DEMUX 21 as two-core. However, using a WDM filter, as single-core, those may be connected with the MUX/DEMUX 21 as well.

Figure 3:
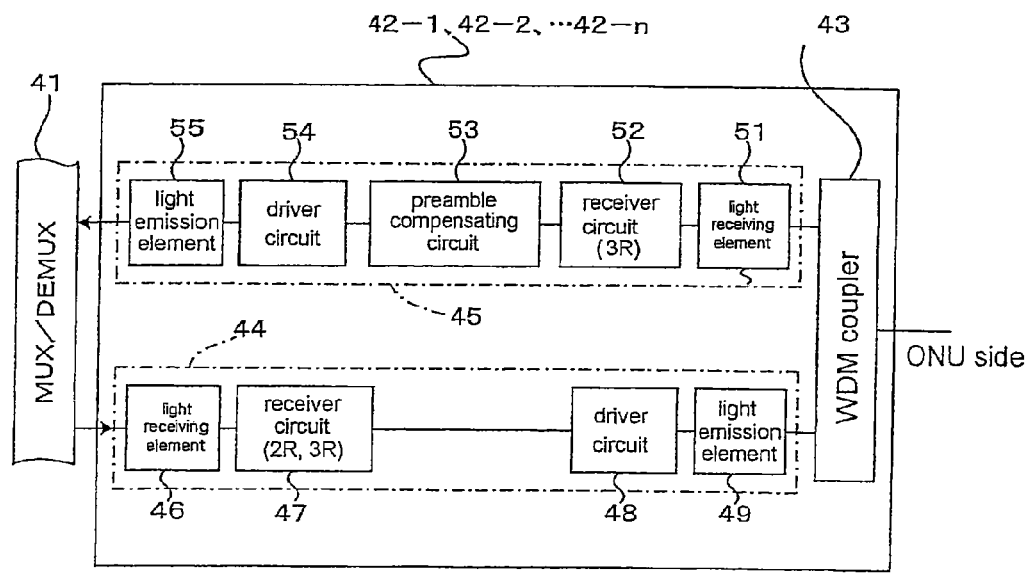
FIG. 3 is a diagram showing a wavelength converting device to be comprised of a user side ORD used for the optical transmission system regarding the first embodiment of the present invention.

Meanwhile, any one of the wavelength converting devices 42-1, 42-2 to 42-n inside the user side ORD 40 comprises, as shown in FIG. 3, a WDM coupler 43 to be connected with the corresponding optical coupler 60, a down transmission system circuit 44 and a up transmission system circuit 45, to be connected between the WDM coupler 43 and the MUX/DEMUX 41 respectively.

Here, the WDM coupler 23 or 43 comprises a configuration for branching a wavelength into a up and a down signals. And then it may be a circulator, or may be a 3 dB coupler combined with an isolator, as a configuration as well.

Moreover, the down transmission system circuit 44 in any one of the wavelength converting devices 42-1, 42-2 to 42-n comprises a light receiving element 46, a receiver circuit 47, a diver circuit 48 and a light emission element 49, to be connected in order toward the propagation direction of an optical signal from the MUX/DEMUX 41. Moreover, the light receiving element 46 is to be configurated, for converting an optical signal input from the MUX/DEMUX 41 into an electric signal, and then for outputting the electric signal to the receiver circuit 47. Moreover, the receiver circuit 47 comprises a configuration for processing the electric signal using a 2R or a 3R function. Moreover, the driver circuit 48 is to be configurated that, based on the signal processed in the receiver circuit 47, with driving the light emission element 49, an optical signal of a predetermined wavelength is to be emitted from the light emission element 49 to the MUX/DEMUX 41. Furthermore, each light emission element 49 in any one of a plurality of the wavelength converting devices 42-1, 42-2 to 42-n is to be a semiconductor laser diode, which a light of substantially the same wavelength-band is emitted respectively therefrom, with such as the wavelength-band between 1.48 and 1.50 μm for example.

Moreover, the up transmission system circuit 45 in any one of the wavelength converting devices 42-1, 42-2 to 42-n comprises a light receiving element 51, a receiver circuit 52, a preamble compensating circuit 53, a driver circuit 54 and a light emission element 55, to be connected in order toward the propagation direction of an optical signal from the corresponding ONU 61-1, 61-2 to 61-n respectively. Moreover, the light receiving element 51 is to be configurated, for converting an optical signal into an electric signal, which is input from the corresponding ONU 61-1, 61-2 to 61-n via the optical coupler 60 and the WDM coupler 43, and then for outputting to the receiver circuit 52. Moreover, the receiver circuit 52 comprises a configuration for processing the electric signal using the 3R function. Here, a level of signals output from a plurality of the ONUs 61-1, 61-2 to 61-n are different from each. Therefore, the receiver circuit 52 comprises such as an auto gain control (AGC) circuit or the like, for identifying a signal or stabilizing the gain. Furthermore, the receiver circuit 52 may also comprise a clock phase aligner (CPA) to output the clock following the data, as the 3R function, in addition to an ordinary clock date recovery (CDR).

Moreover, the preamble compensating circuit 53 comprises a configuration, for compensating a preamble signal included in a burst signal input from the corresponding ONU 61-1, 61-2 to 61-n, via the optical coupler 60, the WDM coupler 43, the light receiving element 51 and the receiver circuit 52, and for converting the burst signal into a continuous signal. Moreover, the driver circuit 54 is to be configurated that, based on the signal output from the preamble compensating circuit 53, with driving the light emission element 55, an optical signal of a predetermined wavelength is to be emitted from the light emission element 55 to the MUX/DEMUX 41. Furthermore, each light emission element 55 is to be a semiconductor laser diode for example, comprising a configuration that a light is emitted of which wavelength is different from each for the corresponding wavelength converting device 42-1, 42-2 to 42-n, within a range of the emission wavelength between 1.26 and 1.36 μm.

Here, the burst signal is to be comprised of a preamble part and a data part (data signal). Moreover, the preamble part is to be comprised of a pattern (one cycle) called a preamble signal as a unit, with repeating a plurality thereof. Furthermore, the data part is to be comprised of a continuous signal with a predetermined bit unit, after the preamble part.

Figure 4:
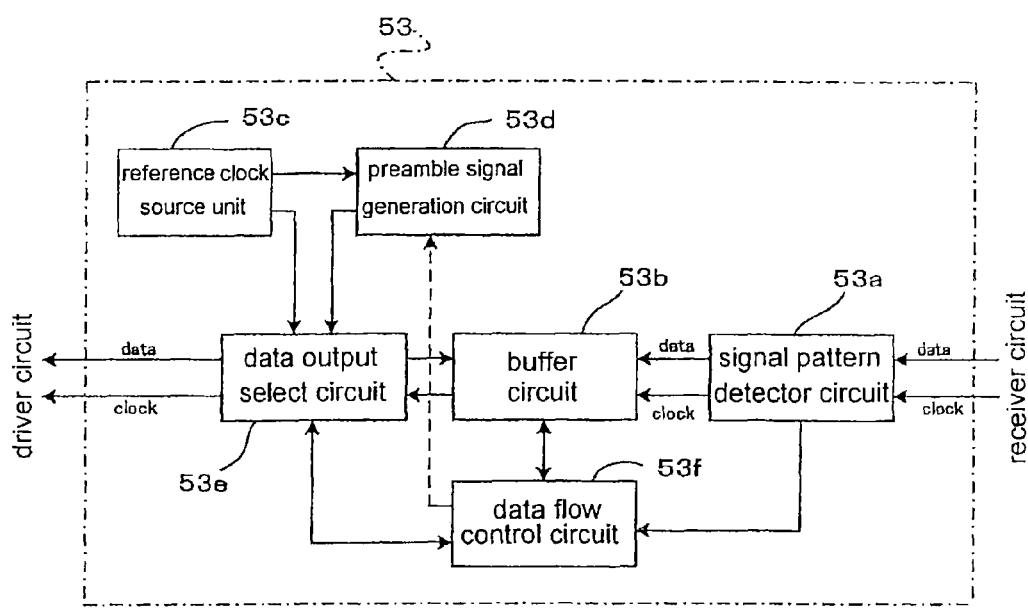
FIG. 4 is a circuit block diagram of a preamble compensating circuit shown in FIG. 3.

Moreover, the above mentioned preamble compensating circuit 53 comprises, as shown in FIG. 4: a signal pattern detector circuit 53a, in which an existence or a nonexistence of a preamble signal and a normality or an abnormality of a data signal are to be determined, based on a signal pattern of "0" and "1" using a burst signal input from the receiver circuit 52; a buffer circuit 53b, for storing as a memory regarding the data signal in the burst signal, which is recognized as normal in the signal pattern detector circuit 53a; a reference clock source unit 53c, for outputting a clock signal of a frequency met the standard of the transmitting signal; a preamble signal generation circuit 53d, for generating a preamble signal with a timing of the clock signal from the reference clock source unit 53c; a data output select circuit 53e, for selecting and outputting either one of the data signal output from the buffer circuit 53b or the preamble signal output from the preamble signal generation circuit 53d; and a data flow control circuit 53f, wherein a storing state of the data in the buffer circuit 53b is to be confirmed, and then for the data output select circuit 53e, to output either one of the data signal or the preamble signal is to be commanded.

Figure 5:
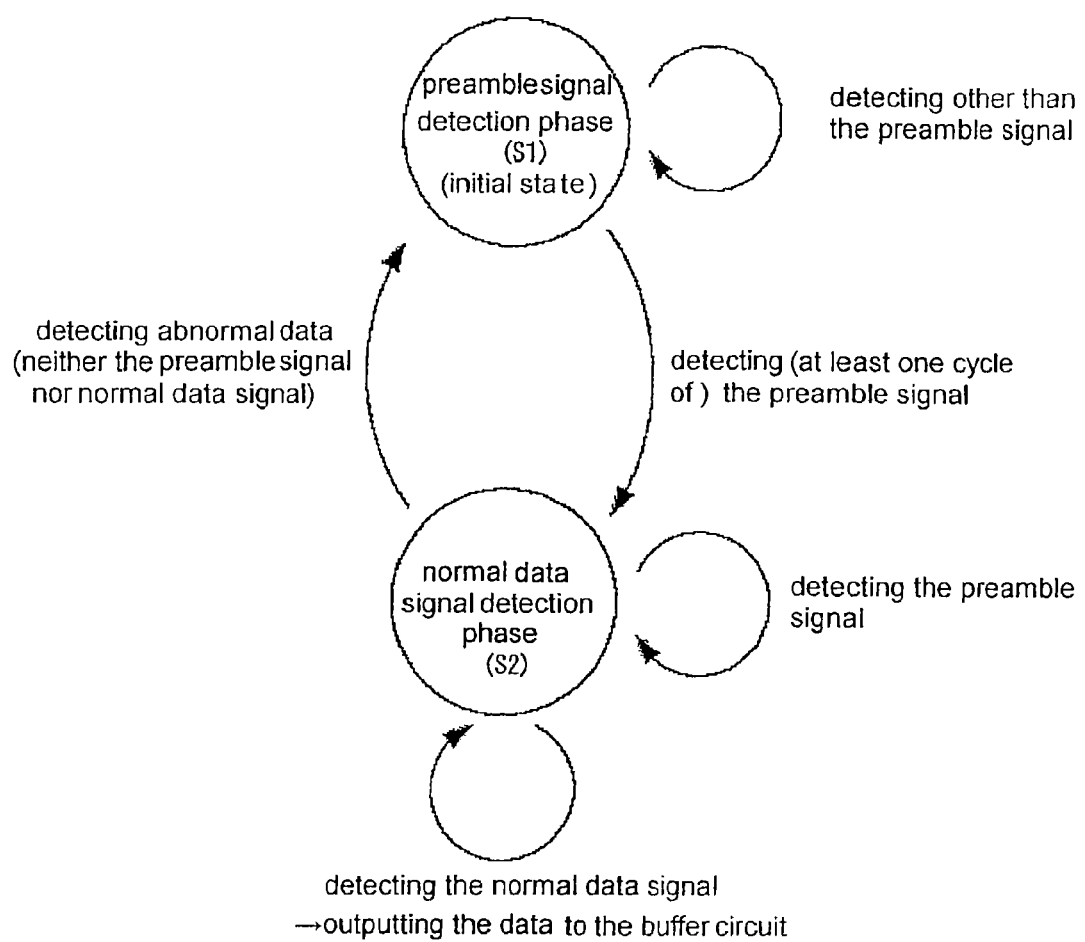
FIG. 5 is a state transition diagram showing a signal processing in a signal pattern detector circuit regarding the preamble compensating circuit shown in FIG. 3.

Regarding the signal pattern detector circuit 53a, one normal data signal included in the burst signal is to be processed for being output to the buffer circuit 53b, following a state transition diagram as shown in FIG. 5. That is to say, in the signal pattern detector circuit 53a, first, a preamble signal is to be waited as a preamble signal detection phase (an S1 in FIG. 5) as an initial state, and then the signal input from the receiver circuit 52 is to be determined as the preamble signal or not. In case the input signal is not the preamble signal, the input signal is to be deleted, and then another input signal is to be further waited in the similar preamble signal detection phase (the S1 in FIG. 5). In case the input signal is the preamble signal, it is to be shifted to a normal data signal detection phase (an S2 in FIG. 5). And then a next input signal is to be determined as any one of a data signal, a preamble signal, or others (an abnormal data), in every detection unit. Moreover, regarding the normal data signal detection phase (the S2 in FIG. 5), in the case of a preamble signal being detected, it is to be stayed in the similar phase as a normal state detection phase (the S2 in FIG. 5), and then input signals are continued to be processed. On the contrary, in the case of an input signal being determined as a normal data signal, the data signal is to be output to the buffer circuit 53b. And then it is to be stayed in the normal data signal detection phase (the S2 in FIG. 5), and then input signals are being processed in every detection unit. Meanwhile, in case a data signal is abnormal, it is to be shifted to the preamble signal detection phase again (the S1 in FIG. 5).

Moreover, a determination, for the input signal into the signal pattern detector circuit 53a as a preamble signal or not, is performed by determining a bit string of the input signal pattern as a predetermined pattern or not. In this case, the detection of the preamble signal is performed by detecting at least one cycle of the preamble signal. Furthermore, the determination of the normality for the data signal is to be performed by detecting with a predetermined bit unit for a signal pattern. And then for example in the case of a gigabit Ethernet (the registered trade name) signal, an error signal detection function for an 8B/10B signal may be used. Or, in the case of a scrambled signal, a function may be used therefor, which a signal pattern normally inconceivable is determined to be abnormal. Here, regarding the scrambled signal, as an inconceivable signal pattern, for example, "0" or "1" is continued a certain numbers or more as the signal pattern to be considered. Furthermore, the preamble signal or the data signal determined as abnormal is to be treated as an abnormal data.

Moreover, regarding the signal pattern detector circuit 53a, at the time of the phase being shifted (from the preamble signal detection phase to the normal data signal detection phase, or vice versa), the state is to be output to the data flow control circuit 53f.

Moreover, regarding the buffer circuit 53b, the data signal transmitted from the signal pattern detector circuit 53a is to be stored. Furthermore, it has a function to perform that, for preventing from slipping data due to the time difference between a clock of the data signal detected in the signal pattern detector circuit 53a and the reference clock from the reference clock source unit 53c, the reference clock is to be transshipped between the input signal and the output signal therein. Here, the minimum requisite data amount as a buffer is given by the following (equation 1).

$$\begin{aligned}\text{The minimum buffer data amount} =\quad &\text{(equation 1)}\\ 2 \times \text{(clock time difference between input and output)} \times&\\ \text{(the maximum data amount per one packet)} +&\\ \text{(data amount of a preamble signal per one cycle)}.&\end{aligned}$$

Here, in (equation 1), the clock difference between input and output is to be a value within the maximum clock difference of the relevant transmission system. Moreover, the maximum data amount per one packet means the data amount for the period between one preamble signal and next preamble signal being input thereinto.

Moreover, the reference clock source unit 53c is used as a reference for a frequency of an output signal from the data output select circuit 53e. Furthermore, a clock is output therefrom as well, which is to be used as a reference clock for a preamble signal output from the preamble signal generation circuit 53d.

Moreover, the preamble signal generation circuit 53d comprises a configuration that, a preamble signal appropriate for the system is to be iteratively generated, with being synchronized with the clock of the reference clock source unit 53c, and the preamble signal is to be output corresponding to a request from the data output select circuit 53e or the data flow control circuit 53f. For example, in the case of an Ethernet (the registered trade name) signal, a preamble signal called Idle is to be generated.

Moreover, the data flow control circuit 53f is to be configurated that, a buffer amount in the buffer circuit 53b is to be monitored, and then at the time of becoming a state as no buffer error being occurred in one packet, with a timing of ending one cycle for a preamble signal generated in the preamble signal generation circuit 53d, with controlling the data output select circuit 53e, a data signal is to be output from the buffer circuit 53b to the data output select circuit 53e, for continuing with the previous preamble signal. Furthermore, the data flow control circuit 53f has a control function that, from the signal pattern detector circuit 53a, a state of the signal pattern detector circuit 53a is to be received therein, and then based on the state, following the preamble signal, the data signal in the buffer circuit 53b is to be output to the data output select circuit 53e, for outputting a continuous signal from the data output select circuit 53e. Moreover, it has another function that a data signal stored in the buffer circuit 53b is to be deleted. For example, after a certain period of time passed since the phase being shifted from the normal data signal detection phase (the S2 in FIG. 5) to the preamble signal detection phase (the S1 in FIG. 5), the data signal stored in the buffer circuit 53b may be deleted as well.

Furthermore, the data output select circuit 53e is to be configured, for synchronizing a data signal output from the buffer circuit 53b with a clock from the reference clock source unit 53c, for transmitting the data signal to the driver circuit 54, and for outputting a preamble signal generated in the preamble signal generation circuit 53d to the driver circuit 54 at the period of no data signal being output from the buffer circuit 53b.

Here, the down transmission system circuit 44 and the up transmission system circuit 45 in any one of the wavelength converting devices 42-1, 42-2 to 42-n are individually connected with the MUX/DEMUX 41 as two-core. However, using a WDM filter, as single-core, those may be connected with the MUX/DEMUX 41 as well.

Next is a description for a signal propagation and a signal processing regarding the above mentioned PDS type optical transmission system.

First, regarding the down transmission system, a signal in a wavelength range between 1.48 and 1.50 μm output from each OSU 11-1, 11-2 to 11-n in the OLT 10 is to be transmitted into the corresponding wavelength converting device 22-1, 22-2 to 22-n. Moreover, in the receiver circuit 26 therein, a 2R or a 3R signal processing is to be performed therefor. And, in the driver circuit 27 and then in the light emission element 28, the signal is to be converted into a different wavelength for WDM. Furthermore, in the MUX/DEMUX 21, it is to be multiplexed, and then it is to be WDM transmitted through the optical transmission path 30.

Moreover, the WDM signal transmitted from the central office side ORD 20 via the optical transmission path 30 is branched by the MUX/DEMUX 41 in the user side ORD 40. Furthermore, each branched signal is to be input into the predetermined wavelength converting device 42-1, 42-2 to 42-n respectively. And then it is to be converted into an electric signal in the light receiving element 46 in the down transmission system circuit 44 therein. Moreover, in the receiver circuit 47, the 2R or the 3R signal processing is to be performed therefor. Next, in the driver circuit 48 and then the light emission element 49, the electric signal is to be converted into an optical signal with a wavelength conversion to an arbitrary wavelength, for example 1.55 µm wavelength-band or 1.3 µm wavelength-band. And then the optical signal is to be output to the optical coupler 60 via the WDM coupler 43. Furthermore, the signal output from the user side ORD 40 is to be further branched by the optical coupler 60 into a plurality of optical signals, and then each of them is to be input into the corresponding ONU 61-1, 61-2 to 61-n respectively.

Meanwhile, regarding the up transmission system, the burst signal output individually from a plurality of the ONUs 61-1, 61-2 to 61-n is to be multiplexed via the optical coupler 60 respectively. Next, it is to be input into the corresponding wavelength converting device 42-1, 42-2 to 42-n in the user side ORD 40. And then through the WDM coupler 43 therein, the burst signal is to be propagated to the light receiving element 51 in the up transmission system circuit 45. Moreover, an electric signal converted from the burst signal in the light receiving element 51 is to be 3R processed in the receiver circuit 52, and then it is to be input into the preamble compensating circuit 53.

Figure 6:
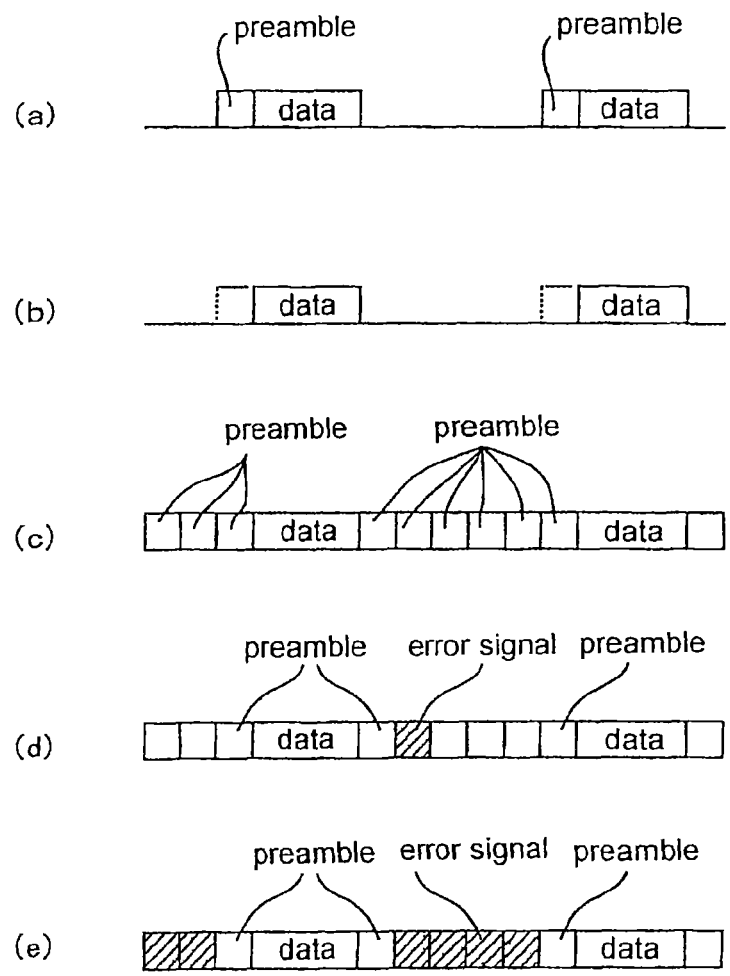
FIG. 6 is a signal waveform diagram showing before and after processing a burst signal processed in the preamble compensating circuit used for the optical transmission system regarding the first embodiment of the present invention.

Regarding every preamble compensating circuit 53, as shown in FIG. 6 (*a*), a burst signal input from the receiver circuit 52 is, first, to be performed for detecting a preamble signal in the signal pattern detector circuit 53a shown in FIG. 4, as the preamble signal detection phase (the S1 in FIG. 5). In case a preamble signal is detected, it is to be shifted to the normal data signal detection phase (the S2 in FIG. 5). And then next input signal is to be determined as a preamble signal, a normal data signal, or an abnormal signal. In the case of the preamble signal, it is to be stayed at the similar normal data detection phase. In the case of the normal data signal, as shown in FIG. 6 (*b*), such the normal data signal is to be output to the buffer circuit 53b, and then it is to be stayed at the similar normal data detection phase (the S2 in FIG. 5). On the contrary, in case the signal input into the signal pattern detector circuit 53a is neither the normal data signal nor the preamble signal, the signal is to be determined as abnormal and to be deleted. And then it is to be shifted to the preamble signal detection phase again (the S1 in FIG. 5). Furthermore, in case the signal pattern detector circuit 53a is to be shifted from the normal data signal detection phase (the S2 in FIG. 5) to the preamble signal detection phase (the S1 in FIG. 5), a signal meaning the state is to be output to the data flow control circuit 53f.

Regarding the buffer circuit 53b, the normal data signal input from the signal pattern detector circuit 53a is to be stored therein. In this case, the buffer circuit 53b has the buffer data amount according to the above expressed (equation 1). And then slipping the data, due to the clock difference between the clock of the input data signal and that of the reference clock source unit 53c, is to be prevented.

Moreover, in the data flow control circuit 53f, the buffer data amount of the buffer circuit 53b is to be monitored. In the case of a state that no buffer error is occurred in one packet, for outputting the stored data signal in the buffer circuit 53b to the driver circuit 54, with a timing of ending one cycle of a preamble signal output from the preamble signal generation circuit 53d, the data output select circuit 53e is to be controlled. Moreover, in the case of a state that no data signal is output from the buffer circuit 53b, for transmitting a preamble signal generated in the preamble signal generation circuit 53d to the driver circuit 54, the data output select circuit 53e is to be controlled. Furthermore, from the signal pattern detector circuit 53a, the phase state of the signal pattern detection is to be received therein. For example, from the normal data detection phase to the preamble signal detection phase, the phase state is to be shifted. And then after a certain period of time passed, a control signal is to be output to the buffer circuit 53b, for deleting the data signals stored in the buffer circuit 53b.

Here, the data signal output from the buffer circuit 53b is to be synchronized with the clock output from the reference clock source unit 53c, in the data output select circuit 53e.

Furthermore, the pattern of the preamble signal is not limited to single, but there may be a system in which two or more types of signal patterns are existed as well. In this case, the preamble signal generation circuit 53d is to be configured for being able to generate a plurality of signal patterns. Moreover, selecting a type of the pattern is to be performed for the preamble signal output from the preamble signal generation circuit 53d, as shown with a dashed arrow in FIG. 4, using a control signal output from the data flow control circuit 53f to the preamble signal generation circuit 53d.

According to such the preamble compensating circuit 53, a gap between any neighboring pair of the burst signals output from the corresponding ONU 61-1, 61-2 to 61-n, such as a continuous signal of "0" for example, is to be recognized as an abnormal data signal in the signal pattern detector circuit 53a. And then for such the gap, in the data output select circuit 53e, a preamble signal is to be inserted thereinto. Therefore, in the preamble compensating circuit 53, the burst signal processed in the receiver circuit 52 is to be converted into a continuous signal comprised of a preamble signal and a data signal, as shown in FIG. 6 (*c*) as an example. Thus, for the driver circuit 54 and for all the components upward therefrom, not a component for burst signals, but a low cost component for continuous signals becomes possible to be used.

Furthermore, a delay amount in the preamble compensating circuit 53 is to be depended on the buffer data amount in the buffer circuit 53b.

From such the preamble compensating circuit 53, a continuous signal is output. And then using the driver circuit 54, based on the continuous signal, the light emission element 55 is driven. Thus, an optical signal of 1.3 µm wavelength-band, that is to say, between 1.26 and 1.36 µm, is to be output therefrom.

Moreover, from each light emission element 55 in the corresponding wavelength converting device 42-1, 42-2 to 42-n, every optical signal of different wavelength in the 1.3 µm wavelength-band is to be output. Moreover, the optical signal output from each light emission element 55 is to be multiplexed in the MUX/DEMUX 41, and to be propagated to the MUX/DEMUX 21 for de-multiplexing in the central office side ORD 20, via the optical transmission path 30. And then the de-multiplexed signal is to be input into a predetermined one of the wavelength converting devices 22-1, 22-2 to 22-n corresponding to each wavelength thereof. Furthermore, via the WDM coupler 23, it is to be transmitted to the corresponding OSU 11-1, 11-2 to 11-n of a receiving wavelength range between 1.26 and 1.36 µm in the OLT 10. In this case, the signal output from the MUX/DEMUX 41 is not to be performed on wavelength conversion and signal processing. Therefore, a cost for such circuits becomes able to be suppressed.

According to the above mentioned present embodiment, the central office side ORD 20 has the wavelength conversion function for the downward signal. Moreover, it has another function for the upward signal to be propagated directly from the user side ORD 40 to the OSUs 11-1, 11-2 to 11-n in the OLT 10.

Thus, the signal output from the OLT 10 to the ONUs 61-1, 61-2 to 61-n side is to be converted into a signal of the wavelength for WDM in the central office side ORD 20. Therefore, as the wavelength for the existing OLT 10, it becomes possible to be transmitted.

Moreover, in the user side ORD 40, the upward signal is to be converted into a signal of the wavelength for WDM, as being fallen within the wavelength range for the OLT 10 to receive thereof. For example, in the G-PON or the GE-PON compliant OLT 10, an optical signal of certainly wide wavelength-band between 1.26 and 1.36 μm is able to be received. And then by converting a upward signal into a WDM optical signal using the ORD 40 in the wavelength-band therebetween, even in the existing OLT 10, the WDM optical signal becomes possible to be received.

Therefore, according to the above mentioned PDS type optical transmission system, with using the existing compliant OLT unit without changing any, the long distance communication becomes possible to be realized.

Moreover, regarding the preamble signal included in the upward burst signal, the disappearance of the preamble signal, occurred at the period of receiving the burst signal or the period of the re-timing operation, is to be recognized as abnormal. Furthermore, a disappeared part of the preamble signal is deleted, and then another preamble signal is to be added. Hence, the preamble signal becomes to be restored. Thus, decreasing the throughput for data transmission, due to the disappearance of the preamble signal occurred in the ordinary repeaters, becomes able to be prevented.

Furthermore, a gap between any neighboring pair of the burst signals output from the corresponding ONU 61-1, 61-2 to 61-n is to be recognized as an abnormal data signal, and then it is output from the preamble compensating circuit 53, with adding a preamble signal therebetween. Thus, the output signal becomes to be a continuous signal, and then for subsequent components from then onward, a low cost component becomes possible to be used, as not for burst signals but for continuous signals.

According to the above mentioned embodiment, for all gaps between any neighboring pair of the burst signals output from each ONU 61-1, 61-2 to 61-n, a preamble signal is to be added. In this case, as a continuous signal, there becomes no separation between any neighboring pair of the burst signals. On the contrary, for easy identification of the separation between each burst signal, an error signal may also able to be add onto a gap between any neighboring pair of the burst signals. In the case of adding the error signal, it is to be detected in the signal pattern detector circuit 53a. Thus, the separation between any neighboring pair of the burst signals becomes possible to be definitely detected thereby.

Moreover, as a method to add the error signal onto the gap between any neighboring pair of the burst signals, for example, data of the error signal is to be stored in the data output select circuit 53e. And then at the period of no data signal being output from the buffer circuit 53b and also no preamble signal being output from the preamble signal generation circuit 53d, the error signal becomes able to be output from the data output select circuit 53e to the driver circuit 54.

Moreover, for the above mentioned error signal, an error signal of an encoding rule may be able to be added thereon. For example, in the case of using the 8B/10B conversion as the encoding rule, an error signal of at least 10 bits is preferable to be added thereon.

Moreover, as another error signal, a signal, which repeats "1" and "0" alternately with not less than a predetermined number of times, is more desirable to be added as the error signal thereon. Furthermore, as another error signal, for example "111" and "000" may be also able to be alternately added thereon, however, the frequency becomes one third in this case. Therefore, for more preferable, it is very well to repeat "1" and "0" alternately with not less than a predetermined number of times.

In the case of adding the error signal onto the gap between any neighboring pair of the burst signals as described above, as shown in FIG. 6 (*d*) for example, for a part of the gap between any neighboring pair of the burst signals, the error signal may be added thereon. In this case, for the above mentioned 8B/10B encoding rule, the error signal of at least 10 bits is to be added thereon.

Or, as shown in FIG. 6 (*e*), for all gaps between any neighboring pair of the burst signals, the error signal may be added as well. In such the case of adding the error signal onto all gaps between any neighboring pair of the burst signals, it becomes to be a continuous signal comprised of the preamble signal, the data signal and the error signal, as similar to the continuous signal comprised of the preamble signal and the data signal shown in FIG. 6 (*c*) as one example. Therefore, for subsequent components from then onward, a low cost component for continuous signals becomes possible to be used, and it is more desirable.

The Second Embodiment

Figure 7:
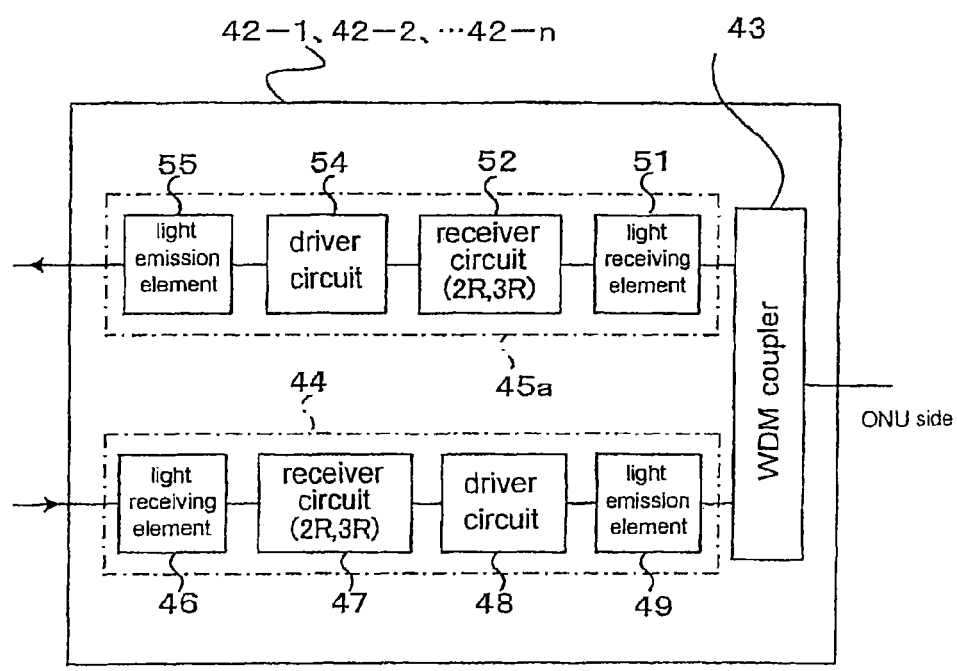
FIG. 7 is a circuit block diagram showing a wavelength converting device to be comprised of a user side ORD used for a PDS type optical transmission system regarding the second embodiment of the present invention.

FIG. 7 is a circuit block diagram showing a wavelength converting device to be comprised of a user side ORD used for a PDS type optical transmission system regarding the second embodiment of the present invention, wherein a symbol similar to that in FIG. 3 shows the similar element.

That is to say, FIG. 7 shows a configuration of any one of the wavelength converting devices 42-1, 42-2 to 32-n in the user side ORD 40 used for the optical transmission system shown in FIG. 1. As different from FIG. 3, it comprises a configuration that there is no preamble compensating circuit 53 in the up transmission system circuit 45a.

Hence, a preamble signal included in a upward burst signal output from any one of the ONUs 61-1, 61-2 to 61-n is not to be compensated. Moreover, without converting the burst signal into a continuous signal, the signal is to be processed for the 2R or the 3R in the receiver circuit 52.

Such the wavelength converting devices 42-1, 42-2 to 42-n are to be used for a PDS type optical transmission system, in which a preamble signal is sufficiently long that a disappearance of the preamble signal in the user side ORD 40 is not to be considerable.

In this case, using the user side ORD 20, the WDM becomes possible as well. Moreover, using the conventional OLT 10 and the conventional ONUs 61-1, 61-2 to 61-n, the long distance communication becomes possible to be realized.

The Third Embodiment

Figure 8:
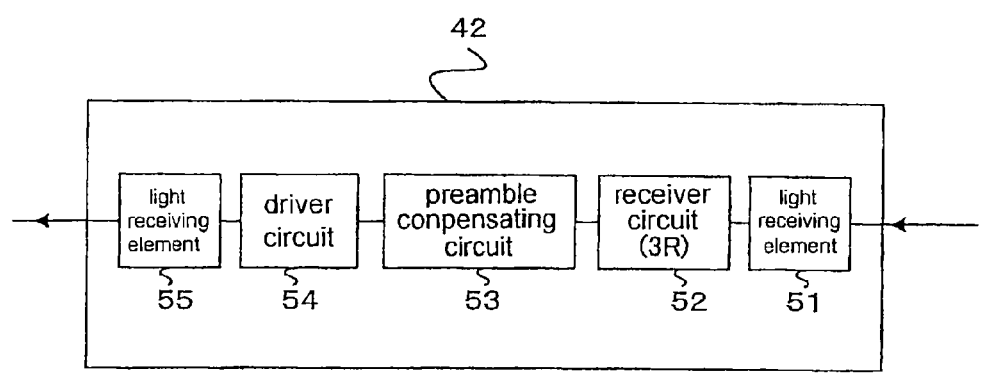
FIG. 8 is a circuit block diagram showing an ORD to be connected with an optical transmission path for a burst signal including a preamble signal in such as an optical transmission system regarding the third embodiment of the present invention.

FIG. 8 is a circuit block diagram showing an ORD to be connected with an optical transmission path for a burst signal including a preamble signal in such as an optical transmission system regarding the third embodiment of the present invention, wherein a symbol similar to that in FIG. 3 shows the similar element.

In FIG. 8, an optical repeater device (ORD) 42 comprises the similar configuration to the up transmission system circuit 45 in any one of the wavelength converting devices 42-1, 42-2 to 42-n provided in the user side ORD 40 in FIG. 1. That is to say, it comprises the configuration that, the light receiving element 51, the receiver circuit 52, the preamble compensating circuit 53, the driver circuit 54 and the light emission element 55 are connected in order toward the optical signal transmission direction therebetween.

Such the ORD 42 is not limited to be used as the user side ORD 40 shown in FIG. 1. And, with compensating a disappearance of a preamble signal in a burst signal, it is possible to be connected with other optical transmission parts required to be relayed. Thus, it becomes possible not only for converting a wavelength of a burst signal, but also for converting into a continuous signal with filling a gap between any neighboring pair of the burst signals with a preamble signal. Therefore, for components subsequent to the ORD 42, a low cost component for continuous signals becomes able to be used.

The Fourth Embodiment

Figure 9:
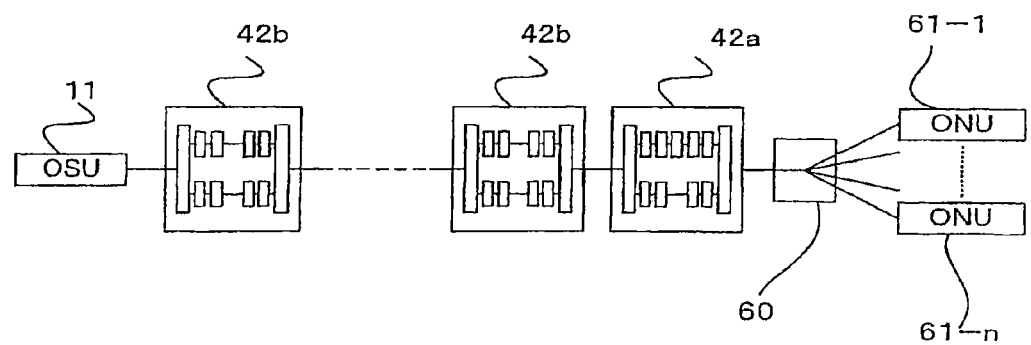
FIG. 9 is a diagram of an optical transmission system regarding the fourth embodiment of the present invention.

FIG. 9 is a diagram of an optical transmission system regarding the fourth embodiment of the present invention, wherein a symbol similar to that in FIG. 1 shows the similar element. Moreover, FIG. 10 and FIG. 11 are diagrams showing wavelength converting devices used for the optical transmission system in FIG. 9, wherein a symbol similar to that in FIG. 3 or FIG. 7 shows the similar element.

Figure 10:
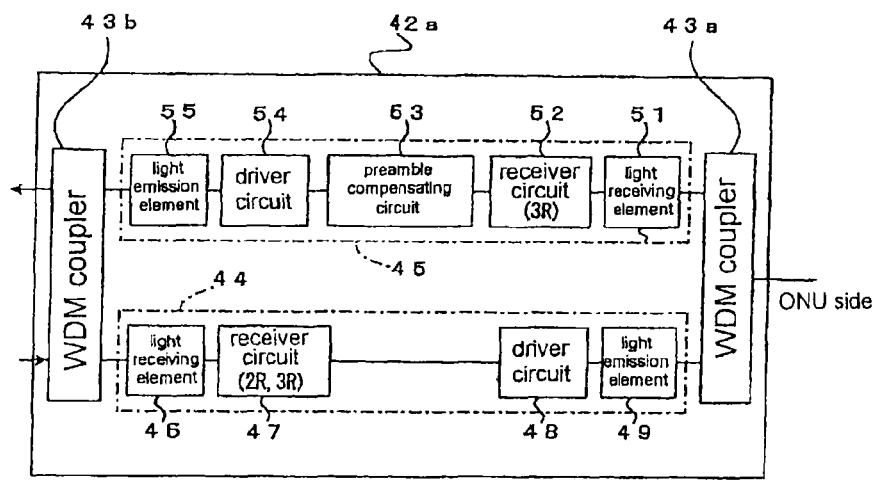
FIG. 10 is a diagram showing a first wavelength converting device used for the optical transmission system in FIG. 9.
Figure 11:
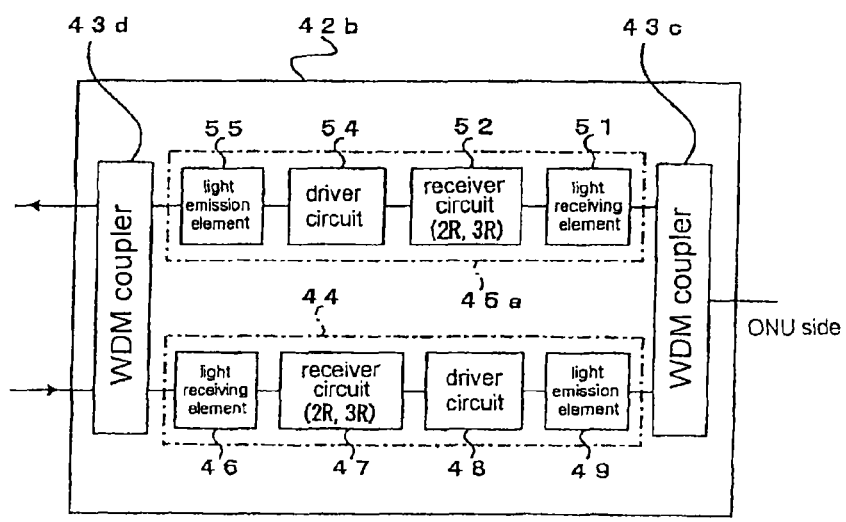
FIG. 11 is a diagram showing a second wavelength converting device used for the optical transmission system in FIG. 9.
Figure 12:
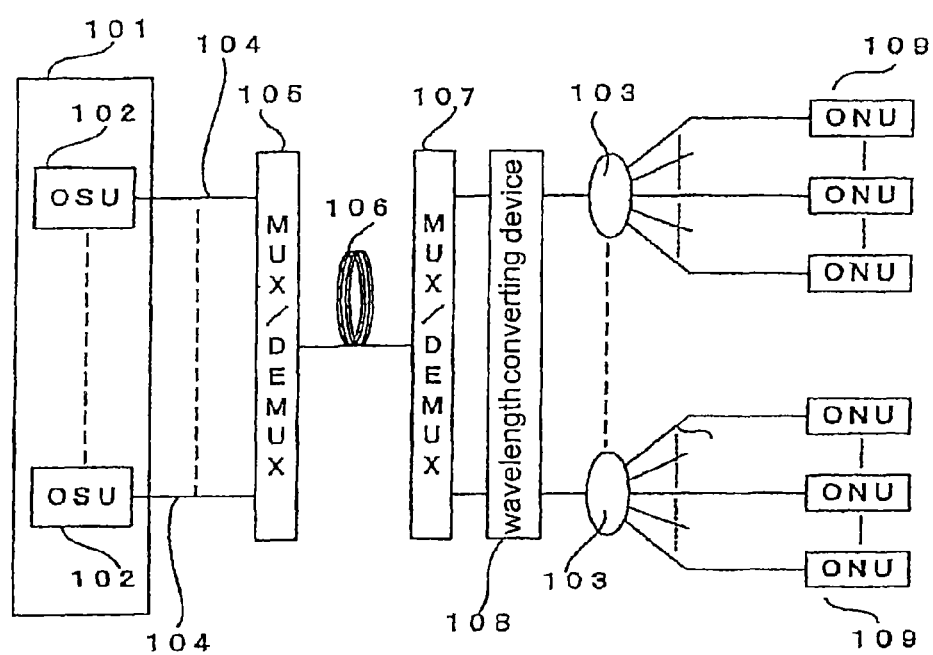
FIG. 12 is a diagram of a conventional optical transmission system.
Figure 13:
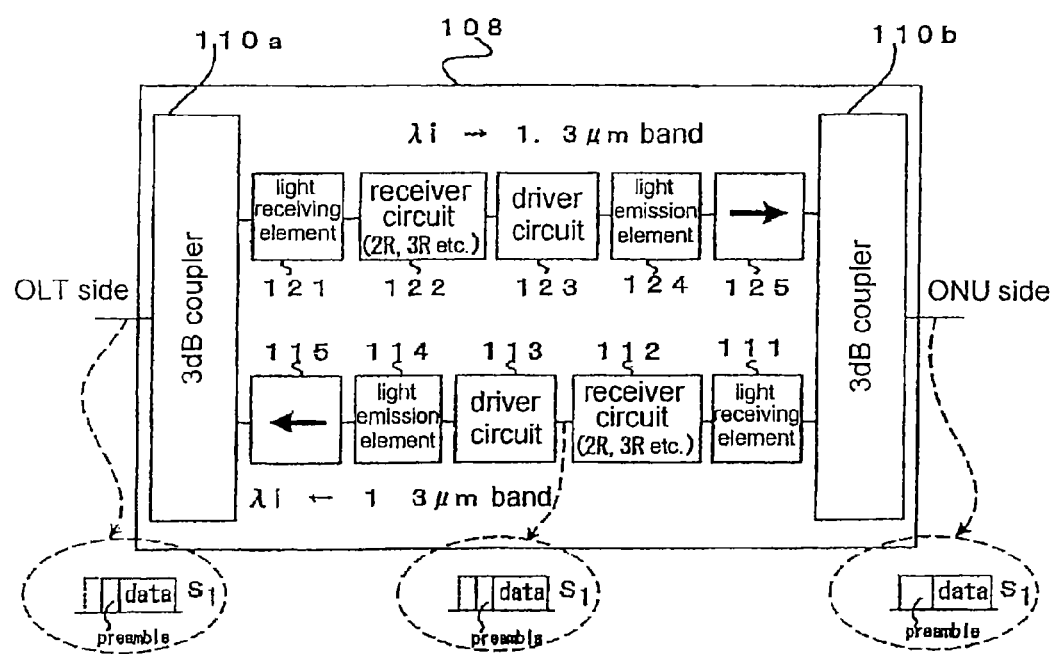
FIG. 13 is a circuit block diagram of a wavelength converter shown in FIG. 12.

In FIG. 9, between the OSU 11 and the optical coupler 60, a first wavelength converting device 42a, which a preamble compensating circuit 53 shown in FIG. 10 is built thereinto, and a second ordinary wavelength converter 42b shown in FIG. 11, which no preamble compensating circuit 53 is comprised thereof, are connected therebetween.

As shown in FIG. 10, the first wavelength converting device 42a comprises, as the similar configuration to that in FIG. 3, a down transmission system circuit 44 and a up transmission system circuit 45. Furthermore, for both of a sending terminal and a receiving terminal on each of the down transmission system circuit 44 and the up transmission system circuit 45, WDM couplers 43a and 43b are to be connected respectively therewith.

Moreover, the second wavelength converter 42b shown in FIG. 11 comprises, as the similar configuration to that in FIG. 7, a down transmission system circuit 44 and a up transmission system circuit 45. Furthermore, for both of a sending terminal and a receiving terminal on each of the down transmission system circuit 44 and the up transmission system circuit 45, WDM couplers 43c and 43d are to be connected respectively therewith.

Here, the first wavelength converting device 42a is to be used as the nearest relaying device to the ONUs 61-1, 61-2 to 61-n, and then for the central office side therefrom, the second wavelength converter 42b may be connected as well.

That is because a burst signal output from any one of the ONUs 61-1, 61-2 to 61-n is to be converted into a continuous signal in the first wavelength converting device 42a, and then there is no problem for any subsequent repeater from then onward to be as the repeater for continuous signals. Thus, increasing the total cost becomes able to be suppressed.

Regarding the present embodiment, the second wavelength converter 42b is described above as one example of the relaying device for continuous signals. Moreover, a method used in the long distance transmission of a continuous signal light, such as an optical amplifier for example, may be possible to be adopted as well.

The invention claimed is:

1. An optical transmission system comprising:
a user side optical repeater device (ORD) to be connected with a user side optical network unit (ONU), for transmitting data in two ways, and for wavelength division multiplexing (WDM);
a central office side ORD to be connected with a central office side optical line terminal (OLT), for transmitting data in two ways, and for WDM; and
a wavelength multiplexing and a wavelength de-multiplexing functions (MUX/DEMUX), for relaying between the user side ORD and the central office side ORD,
wherein the user side ORD includes,
 a first up optical transmission circuit, for converting a plurality of optical signals output from the user side ONU into optical signals of different wavelength respectively, and for outputting to the wavelength MUX/DEMUX;
 a first down optical transmission circuit, for converting optical signals of different wavelength output from the central office side ORD via the wavelength MUX/DEMUX into optical signals of the same wavelength-band, and for outputting the optical signals to an optical transmission path reaching the user side ONU; and
 a preamble compensating circuit, for taking out a normal data signal from burst signals propagated from the user side ONU, and for adding a preamble signal before and/or after the data signal, and
wherein the central office side ORD includes,
 a second down optical transmission circuit, for converting a plurality of optical signals output from the central office side OLT into optical signals of different wavelength respectively, and for outputting to the wavelength MUX/DEMUX; and
 a second up optical transmission circuit including a ray path connecting the wavelength MUX/DEMUX and a configuration for branching a wavelength, for outputting optical signals of different wavelength, output from the user side ONU via the wavelength MUX/DEMUX, to an optical transmission path reaching the central office side OLT via the configuration for branching a wavelength, with same wavelengths respectively, such that the second up optical transmission circuit directly transmits optical signals from the user side ORD to the central office side OLT without converting their wavelengths.

2. The optical transmission system of claim 1, wherein a wavelength of a signal transmitted from the user side ORD to the central office side ORD is to be a band of 1.3 μm.

3. A method, implemented by an optical transmission system, comprising:
transmitting, by a user side optical repeater device (ORD) to be connected with a user side optical network unit (ONU), data in two ways, and performing wavelength division multiplexing (WDM);
transmitting, by a central office side ORD to be connected with a central office side optical line terminal (OLT), data in two ways, and for WDM; and
performing wavelength multiplexing and wavelength de-multiplexing functions (MUX/DEMUX), for relaying between the user side ORD and the central office side ORD, converting, by a first up optical transmission circuit of the user side ORD, a plurality of optical signals output from the user side ONU into optical signals of different wavelength respectively, and outputting to the wavelength MUX/DEMUX;

converting, by a first down optical transmission circuit of the user side ORD, optical signals of different wavelength output from the central office side ORD via the wavelength MUX/DEMUX into optical signals of the same wavelength-band, and outputting the optical signals to an optical transmission path reaching the user side ONU;

at a preamble compensating circuit of the user side ORD, taking out a normal data signal from burst signals propagated from the user side ONU, and for adding a preamble signal before and/or after the data signal, converting, by a second down optical transmission circuit of the central office side ORD, a plurality of optical signals output from the central office side OLT into optical signals of different wavelength respectively, and outputting to the wavelength MUX/DEMUX; and at a second up optical transmission circuit of the central office side ORD that includes a ray path connecting the wavelength MUX/DEMUX and a configuration for branching a wavelength, outputting optical signals of different wavelength, output from the user side ONU via the wavelength MUX/DEMUX, to an optical transmission path reaching the central office side OLT via the configuration for branching a wavelength, with same wavelengths respectively, such that the second up optical transmission circuit directly transmits optical signals from the user side ORD to the central office side OLT without converting their wavelengths.

* * * * *